United States Patent [19]

Berdan

[11] 4,296,587
[45] Oct. 27, 1981

[54] SPACER FOR DOUBLE GLAZED WINDOWS INCORPORATING INTERLOCK MEANS

[75] Inventor: Gunter Berdan, Weston, Canada

[73] Assignee: Custom Rollforming Company Limited, Weston, Canada

[21] Appl. No.: 97,773

[22] Filed: Nov. 27, 1979

[51] Int. Cl.³ ............................................. E04C 2/38
[52] U.S. Cl. ...................................... 52/788; 52/656; 52/737; 52/738; 403/395; 403/401; 403/298
[58] Field of Search .................... 52/788, 656, 475; 403/295, 298, 401, 402, 403

[56] References Cited

U.S. PATENT DOCUMENTS

| | | | |
|---|---|---|---|
| 2,101,349 | 12/1937 | Sharp | 52/656 |
| 2,782,054 | 2/1957 | Nelson . | |
| 2,899,258 | 8/1959 | Spracklen . | |
| 3,070,197 | 12/1962 | Musselman | 52/656 |
| 3,105,274 | 10/1963 | Armstrong | 52/171 |
| 3,200,913 | 8/1965 | Nelson | 52/656 |
| 3,226,093 | 12/1965 | Gugel et al. . | |
| 3,321,223 | 5/1967 | Snow et al. . | |
| 3,510,985 | 5/1970 | Smits | 52/656 |
| 3,546,842 | 12/1970 | Blum | 52/475 |
| 3,866,380 | 2/1975 | Benson | 52/656 |
| 3,919,821 | 11/1975 | Goetz | 52/656 |
| 3,949,526 | 4/1976 | Sherlock et al. | 49/501 |
| 3,994,109 | 11/1976 | Pandell | 52/304 |
| 4,074,480 | 2/1978 | Burton | 52/172 |

FOREIGN PATENT DOCUMENTS 2625993 12/1977 Fed. Rep. of Germany ........ 52/656

Primary Examiner—James L. Ridgill, Jr.
Attorney, Agent, or Firm—Beveride, DeGrandi, Kline and Lunsford

[57] ABSTRACT

A spacer tube for a hermetically sealed double glazed window in accordance with one aspect of the invention is formed from an elongated strip of metal bent into a hollow elongated tubular shape. The spacer tube has opposing side wall portions and a base extending between and connecting the side wall portions. The spacer tube also includes a further wall spaced from the base, such further wall defining a region wherein the longitudinal edges of the strip extend toward each other. That surface of the base which faces into the interior of the spacer tube has a plurality of closely spaced ridges therein, the ridges being spaced apart in the lengthwise directon of the spacer tube and the individual ridges extending generally transversely of the longitudinal axis of the tube. The ridges are located at least in the regions adjacent the ends of the spacer tube thereby, in use, to provide for locking engagement with teeth on the arms of corner pieces when inserted endwise into the ends of the spacer tube.

6 Claims, 7 Drawing Figures

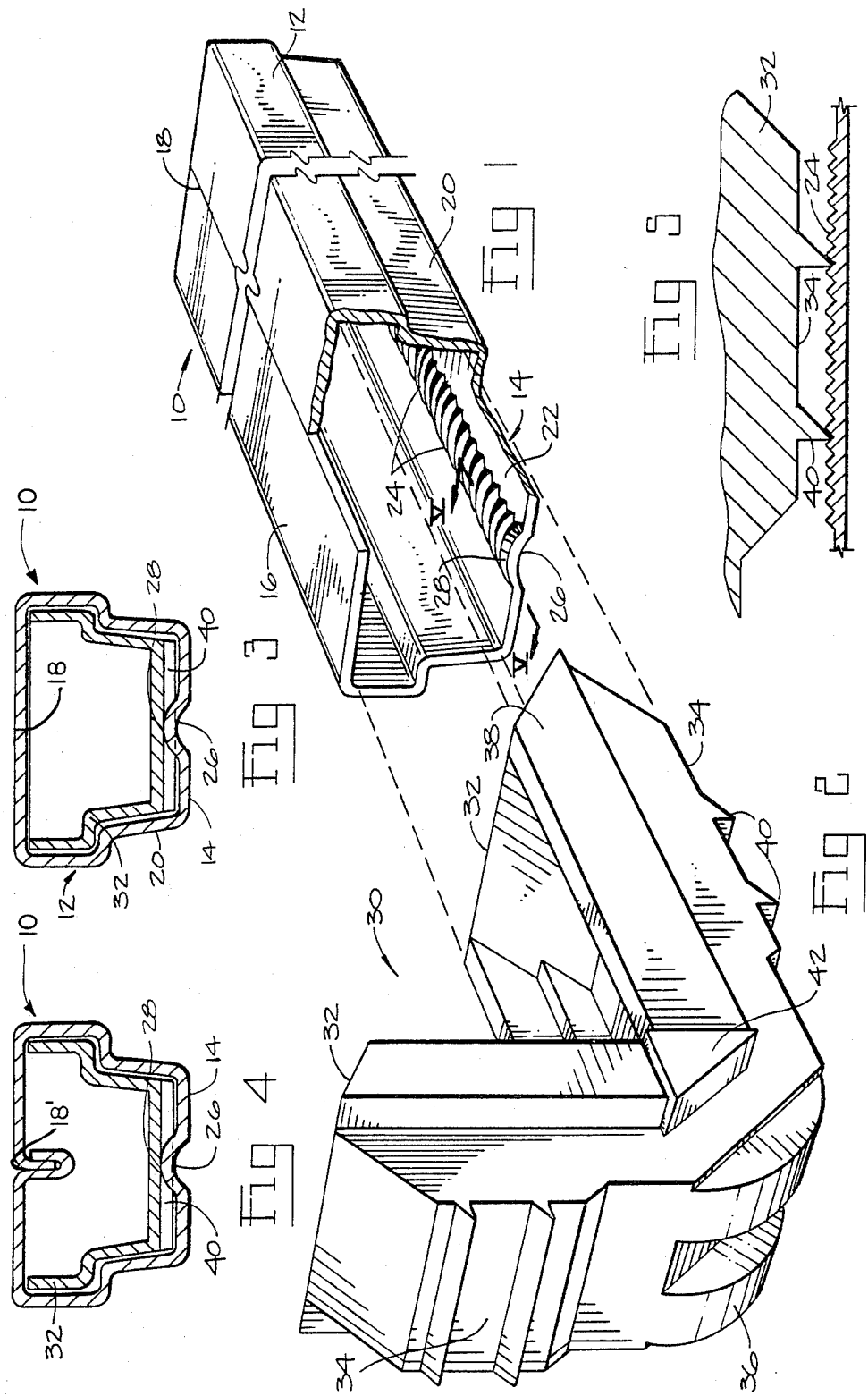

SPACER FOR DOUBLE GLAZED WINDOWS INCORPORATING INTERLOCK MEANS

The present invention relates to spacers for hermetically sealed double glazed window units and particularly relates to an improved spacer arrangement including interlock means for holding corner pieces firmly in position in relation to their associated spacer tubes.

Spacers for separating the glass panels of a hermetically sealed double glazed unit are generally formed from a strip of metal which is roll formed into a tube. The tubular spacer extends around the glazing unit between the outer margins of the glass panels, sealant material being used between the glass and the sides of the spacer. In order to prevent condensation of moisture between the glass panels which would interfere with visibility, the spacer tube contains a desiccant which absorbs any such moisture. Improved forms of spacer tubes are described in our Canadian Pat. No. 1,008,307 issued Apr. 12th, 1977, which patent also discloses an improved form of corner piece for securing the spacers together at right angles to one another.

Although the structures described in the above-noted Canadian patent have performed very satisfactorily, it has been found desirable to provide improved means for securing the corner pieces in the ends of the tubular spacers. If the corner pieces work free of the spacer tubes during assembly operations, the manufacturing process is disrupted thus resulting in increased costs. Thus it is desirable to provide means for securing the corner pieces firmly in position in an efficient manner, which means do not significantly increase the costs of the overall structure and which can be assembled together very quickly and readily without requiring additional assembly steps.

The prior art has provided various means for securing frame elements together at an angle or inclined to one another. Reference may be had to U.S. Pat. No. 2,101,349 issued Dec. 7th, 1937 to Sharp and also to U.S. Pat. No. 3,200,913 issued Aug. 17th, 1965 to Nelson. However, in both of these structures, relatively complex and costly structures are initially required and, furthermore, extra assembly steps are called for. In Nelson, for example, the frame construction includes channelled frame members having corrugations on the sides of the channels with a toothed joining member being force-fitted within the channels of two frame members at the junction of same. The teeth of the joining member are forced transversely through and serve to broach the corrugations with the grooves of the corrugations adjacent the position of broaching receiving the broached material. In addition to the relatively complex structures used, the Nelson procedure calls for special manufacturing steps thereby to effect the transverse movement of the joining member and the broaching of the material. In addition, the Nelson procedure requires open sided channel members which would not be suitable for use as spacers in glazing units. The Sharp patent employs framing strips of aluminum with a connector member having barbs thereon, which member, when forced into the slots or recesses provided in the frame members, serves, by virtue of the barbs, to grip the metal of the softer members so as to make it difficult to separate the members thus joined. In addition, this patent calls for the use of ribs which, after assembly, are peened over into the notches of the holding member by use of a hammer and punch thereby to provide a good interlock between the two members. However, although providing for strong interlock, the peening procedure, which would ordinarily be carried out manually, is very awkward and time consuming thus resulting in increased manufacturing costs. The overall procedure would not be considered suitable for use in relatively lightweight spacer members as are under consideration here.

It is accordingly an object of the invention to provide improvements in spacers and spacer assemblies, particularly improvements in means for interlocking the corner pieces to the spacers in order to eliminate additional manufacturing steps such as crimping or staking after the corner is inserted into the spacer tube. The improvement according to the invention is very economical and efficient and its use assists in keeping manufacturing costs to a minimum.

Accordingly, a spacer tube for a hermetically sealed double glazed window in accordance with one aspect of the invention is formed from an elongated strip of metal bent into a hollow elongated tubular shape. The spacer tube has opposing side wall portions and a base extending between and connecting the side wall portions. The spacer tube also includes a further wall spaced from the base, such further wall defining a region wherein the longitudinal edges of the strip extend toward each other. That surface of the base which faces into the interior of the spacer tube has a plurality of closely spaced ridges therein, the ridges being spaced apart in the lengthwise direction of the spacer tube and the individual ridges extending generally transversely of the longitudinal axis of the tube. The ridges are located at least in the regions adjacent the ends of the spacer tube thereby, in use, to provide for locking engagement with teeth on the arms of corner pieces when inserted endwise into the ends of the spacer tube.

Preferably the ridges are defined by closely spaced parallel serrations.

In a preferred form of the invention the serrations are disposed along the full length of the spacer tube.

Preferably the base is shaped in cross-section so as to define a crest projecting a short distance into the interior of the hollow spacer tube with the transversely disposed ridges or serrations being formed in the crest. Preferably the crest extends the full length of the spacer tube.

In a further aspect the invention provides a corner construction consisting of a corner piece and two spacer tubes as described above, such spacer tubes extending perpendicularly to each other with adjacent ends of the spacer tubes being joined by the corner piece. The corner piece has two arms at right angles to each other each being shaped to fit snugly into an associated one of the adjacent ends of the spacer tubes. Each arm is provided with a surface disposed in close proximity to the inwardly facing surface of the base of its associated spacer tube, such surface having teeth thereon interengaged with certain ones of the ridges defined on such inwardly facing surface.

The above-noted crest and the serrations therein may be easily formed during the roll forming operation used to provide the spacer tube using techniques which will be readily apparent to those skilled in the art in the light of this description.

The teeth on the corner piece are preferably angled towards the corner of the corner piece so as to have a sharp edge which grips the associated serrations when the corner piece is inserted. As the arms of the corner piece are being inserted into the ends of the spacer tubes, a clicking sound will be heard as the teeth of the corner piece move over the serrations. When the corner piece has been fully inserted, the teeth firmly interlock with the serrations thus securing the corner piece firmly in place. No additional manufacturing steps are necessary to provide for proper securement of the corner piece in the spacer tubes. Furthermore, in the case where the serrations extend the full length of the spacer, the spacer tube can be cut to any length and the manufacturer will always be assured that there are serrations disposed adjacent the opposing ends of the spacer tube to provide the necessary interlock with the corner piece. Thus a uniform manufacturing technique can be adopted which will provide a spacer tube design suitable for use with all sizes of double glazed window panels.

A typical embodiment of the invention will now be described by way of example, reference being had to the accompanying drawings wherein:

FIG. 1 is a perspective view of a spacer tube in accordance with the invention, the tube being partially cut away to show the serrations on the interior surface of the base;

FIG. 2 is a perspective view of a typical corner piece for use with the spacer tube shown in FIG. 1;

FIG. 3 is a cross-section view taken through an end portion of the spacer tube and an arm of a corner piece disposed therein;

FIG. 4 is a view similar to that of FIG. 3 but illustrating a modified form of spacer tube; and FIG. 5 is a partial sectional view illustrating a portion of an arm of a corner piece engaged with the serrations formed on the base of the spacer tube.

Figure 7:
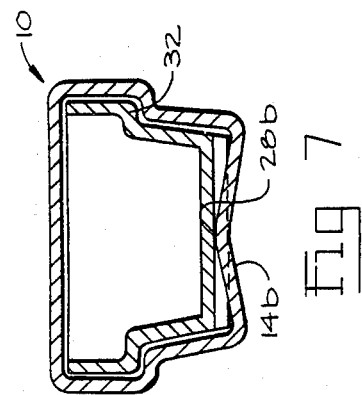
FIGS. 6 and 7 are views similar to FIGS. 3 and 4 and illustrating still further modified forms of spacer tubes.

Referring now to the drawings, the spacer tube 10 as shown in FIG. 1 is formed of a single strip of metal bent into tubular form. The general outline shape of the spacer tube is conventional, such spacer tube 10 including opposing side wall portions 12 which in use abut the inside surfaces of two adjacent glazing panels. The spacer tube also includes a base 14 extending between and connecting the side wall portions 12 and a further wall 16 in spaced parallel relation to the base, which further wall defines a region 18 wherein the longitudinal edges of the strip confront each other. The further wall 16 defines an interior surface which is exposed to view in the final panel assembly. Side wall portions 12 of the spacer tube are provided with exterior recesses 20 for receiving sealant material, which sealant material serves to prevent leakage of air and moisture between the spacer tube and the glass panels (not shown).

The region 18 where the edges of the strip come into confronting relationship with one another may be of a very simple nature as illustrated in FIG. 3 but, more preferably, the edges of the strip are arranged as shown at 18' in FIG. 4 wherein one of the edges has an inturned lip while the other edge is provided with a groove for receiving such lip thereby to provide an interlocking arrangement which prevents spreading of the spacer tube 10 when the corner piece is inserted as described in further detail in our Canadian Pat. No. 1,008,307.

As best seen in FIG. 1, that surface 22 of the base 14 which faces into the interior of the spacer tube 10, is provided with a plurality of closely spaced serrations 24 therein. The serrations are spaced apart in the lengthwise direction of the spacer tube and the individual serrations extend generally transversely of the longitudinal axis of the spacer tube. As noted previously these serrations 24 must be disposed at least in the regions adjacent the ends of the spacer tube but preferably, as in the embodiment illustrated in the drawings, these serrations 24 are disposed along the full length of the spacer tube. In addition, with reference to FIGS. 1, 3 and 4, the base 14 has a concave portion 26 formed therein as best seen in cross section and defining a crest 28 projecting a short distance into the interior of the hollow spacer tube with the transversely disposed serrations 24 being formed in the crest. In the preferred embodiment such concave portion 26 extends the full length of the spacer tube. By providing the concave portion 26, the serrations are fully exposed in the interior of the spacer tube and are capable of readily engaging with the teeth of a corner piece to be hereinafter described. It might be noted here that the spacer tube 10 will usually be made of a relatively soft metal such as aluminum and thus the concave portion 26 and the serrations 24 are readily provided using generally conventional equipment during the roll forming procedure wherein the spacer tube 10 is formed.

The corner piece 30 illustrated in FIG. 2 is of a die-cast aluminum construction but of course those skilled in the art will appreciate that it may be made otherwise, e.g. stamped from a flat piece of metal. The corner piece has two arms 32 extending at right angles to each other, each arm including a flat face 34 with the faces of the two arms being joined by a connecting portion 36 shaped to provide the desired degree of strength and rigidity to the corner piece. Each of the arms 32 is additionally provided with two side flanges 38 turned inwardly from the faces 34 with the general cross-sectional shape of each arm being suited for insertion of same into the end of the spacer tube 10 with the outer edges of side flanges 38 being disposed against the inner surfaces of wall 16 and with the face 34 of each arm being disposed in close proximity to the inwardly facing surface of the base. On each face 34 of the arm there are formed two outwardly projecting teeth 40 which have a generally V-shaped cross-section but being angled toward the corner of the corner piece thereby to provide a sharp edge capable of gripping in the serrations 24 of the spacer tube 10. The cross-sectional shape of such teeth 40 is best seen in FIG. 5 where it will be seen that that face of tooth 40 directed toward the corner of the corner piece is at a 90° angle to face 34, with the opposing face being at about a 45° angle to face 34. Also as seen in FIG. 5 the serrations 24 are of a V-shaped cross-section with each V-shaped serration preferably subtending an angle of approximately 90°. The distance between the outer extremities of teeth 40 on each arm is preferably an even multiple of the pitch or distance between adjacent serrations thus enabling each of the teeth 40 to effectively mate with a respective one of such serrations, in use, thereby to achieve maximum holding power. Those skilled in the art will appreciate, of course, that the number of teeth may be increased if additional holding power is required; however, for most purposes, two teeth 40 on each arm of the corner piece should suffice.

When the arm 32 of the corner piece is being inserted into the end of spacer tube 10, a clicking sound will be heard as the serrations encounter the sloping frontal faces of the teeth 40 with such teeth riding over the individual serrations, such action being permitted by virtue of the fact that the spacer tube 10 possesses a small degree of resiliency. When the corner piece 30 is fully inserted, a shoulder portion 42 on the corner piece comes into abutting relation with the extreme end of the spacer tube 10 thus preventing further insertion of the corner piece. At this point, the teeth 40 of the arm 32 are properly seated within respective ones of the serrations 24 as illustrated in FIG. 5. By virtue of the sharp outer edges of the teeth 40, and also by virtue of the fact that the rearward faces of such teeth are at 90° to face 34 of the associated arm, such teeth engage firmly with the serrations and very strongly resist any outward movement of the corner piece relative to the spacer tube 10. Indeed, the corner piece 30 can only be removed from the spacer tube after a force thereon has been exerted sufficient as to shear off the tips of the serrations 24. On the other hand, by virtue of the 45° slope of the forward faces of teeth 40, the arms of the corner piece are relatively easy to insert into the spacer tube 10 and indeed those skilled in the art will observe that the interlocking arrangement described is rather similar to a ratchet in its overall operation in that it allows relatively easy movement in one direction (when inserting) but strongly resists movement in the opposite direction.

Figure 6:
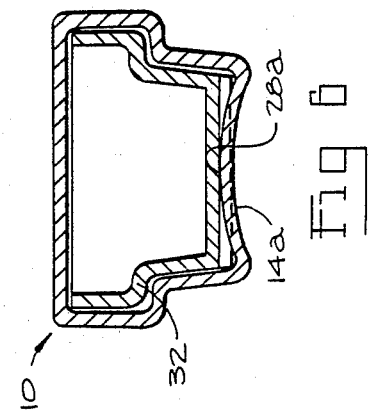

FIGS. 6 and 7 show modified forms of spacer tubes which are the same in general principal as the spacer tube described previously except that in FIG. 6 the crest 28a is formed by virtue of the base 14a being shallowly concavely curved across its full width while in FIG. 7 the crest 28b is formed by virtue of the base 14b being of a shallow V-shaped configuration as seen in cross-section.

The above described embodiments of the invention have been set forth by way of example. It will be appreciated that numerous modifications are possible within the spirit of the invention and the scope of same as set forth in the following claims.

The embodiments of the invention in which an exclusive property or privilege is claimed are defined as follows:

1. A spacer tube for a hermetically sealed double glazed window, the spacer tube being formed from an elongated strip of metal bent into a hollow elongated tubular shape, the spacer tube having opposing side wall portions, a base extending between and connecting the side wall portions and a further wall spaced from the base, such further wall defining a region wherein the longitudinal edges of the strip extend toward each other, and wherein a surface of the spacer tube which faces into the interior of the spacer tube has a plurality of closely spaced ridges therein, said surface having said ridges therein being the interiorly facing surface of said base, the ridges being spaced apart in the lengthwise direction of the spacer tube and the individual ridges extending generally transversely of the longitudinal axis of the spacer tube, the ridges being located at least in the regions adjacent the ends of the spacer tube whereby, in use, to provide for locking engagement with teeth on the arms of corner pieces when inserted endwise into the ends of the spacer tube, said base being shaped in cross-section so as to define a crest projecting a short distance into the interior of the hollow spacer tube, said transversely disposed ridges being formed in said crest.

2. The spacer tube according to claim 1 wherein said ridges are defined by closely spaced parallel serrations.

3. The spacer tube according to claim 2 wherein said spaced transversely extending serrations are disposed along the full length of the spacer tube.

4. The spacer tube according to any one claims 1, 2 or 3 inclusive, said crest extending the full length of the spacer tube.

5. A corner construction consisting of a corner piece and two spacer tubes each in accordance with any of claims 1, 2 or 4 inclusive, the spacer tubes extending perpendicularly to each other with adjacent ends of said spacer tubes joined by the corner piece, the corner piece having two arms at right angles to each other and each shaped to fit snugly into an associated one of said adjacent ends of the spacer tubes, each arm having a face disposed in close proximity to the inwardly facing surface of the base of its associated spacer tube and having teeth thereon interengaged with certain ones of said ridges defined on the base of the spacer tube.

6. A corner construction consisting of a corner piece and two spacer tubes each in accordance with any of claims 1, 2 or 4 inclusive, the spacer tubes extending perpendicularly to each other with adjacent ends of said spacer tubes joined by the corner piece, the corner piece having two arms at right angles to each other and each shaped to fit snugly into an associated one of said adjacent ends of the spacer tubes, each arm having a face disposed in close proximity to the inwardly facing surface of the base of its associated spacer tube and having teeth thereon interengaged with certain ones of said ridges defined on the base of the spacer tube, the teeth being shaped so that a surface thereof facing toward the corner of the corner piece is normal to said face of the arm with the other surface being sloped relative to said face to allow easy insertion of the arm into the spacer tube but difficult withdrawal.

* * * * *

UNITED STATES PATENT AND TRADEMARK OFFICE
CERTIFICATE OF CORRECTION

PATENT NO. : 4,296,587
DATED : October 27, 1981
INVENTOR(S) : GUNTER BERDAN

It is certified that error appears in the above—identified patent and that said Letters Patent is hereby corrected as shown below:

On the cover page, the assignee name is changed to read --Indal Limited/Indal Limitee, Weston, Canada--; and, the following is added:

[30] Foreign Application Priority Data
July 31, 1979 [CA] Canada...332905

Signed and Sealed this

Twelfth Day of January 1982

[SEAL]

Attest:

GERALD J. MOSSINGHOFF

*Attesting Officer*     *Commissioner of Patents and Trademarks*